United States Patent [19]

Sims, Jr. et al.

[11] 4,203,942

[45] May 20, 1980

[54] PROCESS OR TUBULAR WATER-BATH POLYPROPYLENE FILMS

[75] Inventors: J. Robert Sims, Jr., Waquoit, Mass.; Willard N. Mitchell, Baytown; Charles W. Williamson, Seabrook, both of Tex.

[73] Assignee: Exxon Research & Engineering Co., Florham Park, N.J.

[21] Appl. No.: 859,000

[22] Filed: Dec. 9, 1977

Related U.S. Application Data

[63] Continuation of Ser. No. 492,091, Jul. 26, 1974, abandoned, which is a continuation of Ser. No. 322,034, Jan. 8, 1973, abandoned.

[51] Int. Cl.² ............................................. B29D 23/04
[52] U.S. Cl. .................................... 264/559; 264/560; 264/562; 264/565; 264/569; 264/178 R; 425/71
[58] Field of Search ................... 264/89, 95, 209, 237, 264/348, 178 R; 425/71, 72, 326.1, 559, 560, 565, 569, 562

[56] References Cited

U.S. PATENT DOCUMENTS

| | | | |
|---|---|---|---|
| 3,108,324 | 10/1963 | Zavasnik | 264/209 |
| 3,193,547 | 7/1965 | Schott, Jr. | 264/95 |
| 3,400,184 | 9/1968 | Matsuo et al. | 264/95 |
| 3,450,806 | 6/1969 | Matsuo et al. | 264/95 |
| 3,488,746 | 1/1970 | Gilbert | 264/209 |
| 3,622,657 | 11/1971 | North et al. | 264/89 |
| 3,655,846 | 4/1972 | Kanoh et al. | 264/95 |
| 3,685,576 | 8/1972 | North | 425/72 |
| 3,702,224 | 11/1972 | North et al. | 425/71 |
| 3,819,790 | 6/1974 | North et al. | 264/95 |

Primary Examiner—Jeffery R. Thurlow
Attorney, Agent, or Firm—David A. Roth; Myron B. Kurtzman

[57] ABSTRACT

Substantial and commercially important increases in polypropylene film production rates without adversely affecting film quality are obtained in a tubular water film process. The improvements comprise modifications in the die lip, in the mandrel air (fluid) slot affecting the cooling gas velocity, and in the upper bubble pressure control. The improvements are especially useful to obtain mill rolls 60 to 80 inches wide.

4 Claims, 5 Drawing Figures

U.S. Patent
May 20, 1980
4,203,942
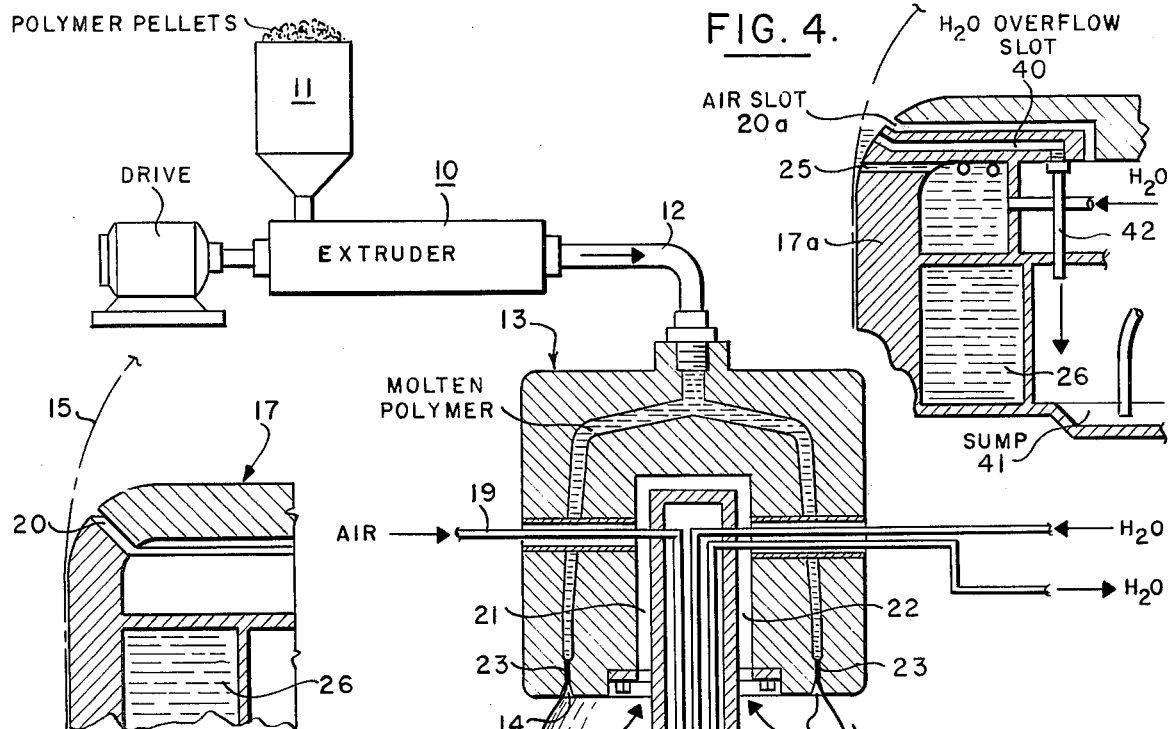
FIG. 1.
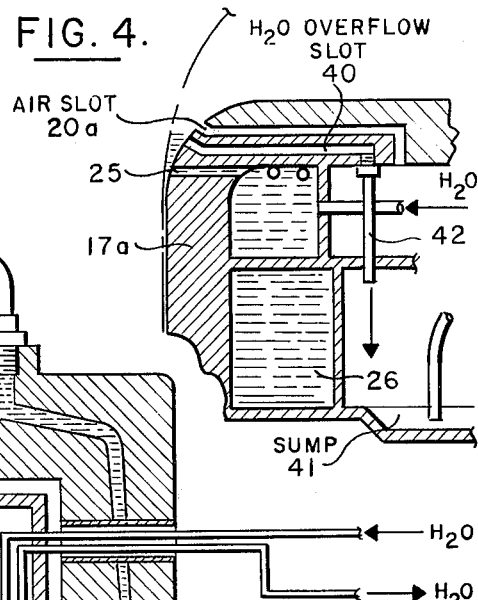
FIG. 4.
FIG. 3.
FIG. 5.
FIG. 2.

PROCESS OR TUBULAR WATER-BATH POLYPROPYLENE FILMS

CROSS-REFERENCE TO RELATED APPLICATIONS

This is a continuation, of application Ser. No. 492,091, filed July 26, 1974, and now abandoned, which is a continuation of Ser. No. 322,034, filed Jan. 8, 1973, and now abandoned.

This application is an improvement over inventions disclosed in U.S. Pat. No. 3,819,790 of North et. al., issued June 25, 1974; U.S. Pat. No. 3,685,576 of North, issued Aug. 22, 1972 and U.S. Pat. No. 3,702,224 of North et. al., issued Nov. 7, 1972 (all of which patents are incorporated by reference in their entirety) and ... patents to be discussed in the subsequent section.

PRIOR ART

Tubular water-bath processes in the generic sense, of which the present application is an improvement, have been fully described in U.S. Pat. Nos. 3,400,184; 3,450,806; and 3,622,657. In its simplest aspect, the tubular water-bath process described therein is a highly sophisticated and effective technique for producing tubular films of high quality from a film-forming thermoplastic.

Essentially, the thermoplastic is extruded from a die in the form of a tubular molten extrudate in a substantially vertical direction from above. The molten tubular extrudate ultimately is rapidly cooled by a combination of a water bath on one side and a cooling mandrel on the other side, the water bath being equipped with a seal at its lower surface acting against the mandrel.

Due to the external water pressure, the film must ultimately touch the surface of the mandrel, and therefore it is very important that the hot, sticky extrudate be processed and treated prior to contact with the mandrel so that it will not adhere to or be marred by the mandrel.

Adhesion to the mandrel results in several extremely undesirable effects. Included in these are that seizing might occur and the process stop altogether; the process might be slowed because of the difficulty of the film passing over the mandrel; the film may become marred or otherwise would acquire imperfections on its surface.

The genius of the original invention was to avoid this adverse effect by a combination of features. These include the technique of directing a high velocity jet of cooling air on a small area of the inside surface portion of the extrudate. This air jet causes preliminary cooling of a small inside portion of the extrudate. Subsequently, the extrudate is conveyed into the water bath.

The inside portion of the extrudate is kept from contacting the mandrel by the air gap formed by some of the air from the high velocity jet while the exterior portion of the extrudate is cooled by the water bath.

When the inside portion of the extrudate ultimately contacts the mandrel, the portion contacting the mandrel has had sufficient preliminary cooling both by the air jet and the water bath portion to have been rigidified and hardened, so that when it contacts the mandrel, no sticking, adhesion, or seizure will occur. This enables the production of high quality film at relatively high production rates, i.e. about 400 pounds per hour for a line producing 70-inch flat width polypropylene tubing.

Utilizing improvements such as the external air ring pressure reduction orifices disclosed in U.S. Pat. No. 3,819,790 of North et al, issued June 25, 1974, which controls the expansion of the melt and stabilizes it as it is drawn down, the improved water bath design disclosed in U.S. Pat. No. 3,685,576 of North, issued Aug. 22, 1972 which provides a much more uniform quench of the extrudate and improved sealing at the bottom of the external water bath and the improvement disclosed in U.S. Pat. No. 3,702,224 of North et al, issued Nov. 7, 1972 which involves an improved internal mandrel design, considerably higher production rates for difficult-to-process resins such as polypropylene, without adversely affecting the quality of the resulting film are obtained. Such rates are in the order of about 500 to 540 pounds per hour.

These are improved rates compared to those which could be obtained with the original technique described in U.S. Pat. No. 3,400,184. But, the exigencies of the marketplace are such that resin prices are continually rising while film prices are declining and, therefore, in order to remain competitive, a given piece of capital equipment must be able to produce considerably more film product in a given time span. That can be accomplished with the technique of the present invention.

SUMMARY OF INVENTION

Tubular film (preferably 60 to 80 inches wide) production rates of consistently over 700 pounds per hour from a difficult-to-process resin such as polypropylene can be produced in a process in which the die orifices, external lips of the air slot, and the velocity of the air as well as the pressure in the upper bubble are all controlled within critical parameters to achieve a substantial increase in production rate without concomitantly adversely affecting film quality.

BRIEF DESCRIPTION OF THE DRAWINGS

FIG. 1 shows the overall process sequence and apparatus therefor;

FIG. 2 shows the detail of a flared die orifice;

FIG. 3 shows the detail of precooling means;

FIG. 4 shows an embodiment for combining air and water precooling; and

FIG. 5 shows an embodiment for water only precooling, i.e. inside-film, between-mandrel water (liquid) cooling.

DESCRIPTION OF THE INVENTION WITH PREFERRED EMBODIMENTS

Although the inventive process and inventive apparatus described herein can be used effectively with any film-forming thermoplastic resin, it is especially well suited for preparing transparent tubular films having uniform diameters from crystalline thermoplastic resins, especially polypropylene. Furthermore, it is particularly well adapted to produce commercial gauge thickness film having a 60 to 80 inch width.

For the purposes of the explanation and discussion which follow, polypropylene will be used as a preferred embodiment, but it is to be understood that the invention is not so limited.

There are several quite different and important considerations in the film-making art, depending upon whether one is making tubular films from a relatively high crystallinity product such as polypropylene or a relatively low crystallinity product, such as low density polyethylene.

Generally, the highly crystalline thermoplastics cannot be used in conventional tubular film processes because if they are cooled slowly, as by air, relatively large spherulites form, thus resulting in a less transparent film. Rapid cooling of the tubular film can eliminate the formation of such spherulites. The process described herein is highly suitable for preparing films from resin such as polypropylene where premature crystallization might be a problem, but that is not to preclude the use of other resins in the process.

In order to understand the specific process apparatus, improvements and features of the present invention, a review of the basic process for general background information is useful.

Thus, as a general matter, a film-forming resin is extruded downwardly in the shape of a molten tubular extrudate from a circular die and passes over a sizing mandrel which is in a water bath that surrounds the mandrel.

Cooling gas from an air jet, usually located in the mandrel, both cools a portion of the extrudate when it impacts upon it and also escapes to inflate the tube formed from the process. Preferably the tubular film may be extruded through an annular die to yield a downwardly directed tubular film having an inside diameter of 3 to 48 inches, and a wall thickness (as it issues from the die) of 10 to 60 mils, preferably 20 to 40 mils.

The downwardly moving molten sheet is preliminarily contacted with air at $-70°$ C. to $+60°$ C., preferably $10°$ C. to $50°$ C., to precool the film to $100°$ C. to $280°$ C.

Preferably, the air will contact the film both externally and internally, the air inside the tube serving to support the film and to expand it to a larger diameter. Precooling is commonly effected to an extent sufficient to achieve maximum polymer viscosity and surface hardening, but insufficiently to generate a "frost-line" on the film prior to further cooling.

Typically, polypropylene film is precooled to $180°$ C. to $289°$ C., preferably $190°$ C. to $230°$ C., and polyethylene film is precooled to $160°$ C. to $235°$ C., preferably $160°$ C. to $190°$ C., at this point, prior to further cooling.

The internal precooling gas is usually passed upwardly within (i.e., countercurrently to) the downwardly descending tubular film. Upwardly, as used herein does not refer to the angle of an air (gas) slot, but rather to the relationship of the air (gas) with respect to the direction of film movement. As the gas contacts the inside of the tubular film, it often, in addition to precooling, serves to expand the film to a diameter slightly larger than that of the cylindrical mandrel used in subsequent steps. The internal precooling gas also serves the important purpose of carrying away undesired volatile products.

Subsequently, the precooled downwardly moving tubular film is passed over and around in slideable contact with a vertically extending mandrel which is completely surrounded by the film. The mandrel, essentially of cylindrical shape, is usually a metal through which heat transfer will readily occur. The outside diameter of the mandrel will be 80% to 300%, preferably 110% to 170%, of the diameter of the annular die. The outside diameter of the mandrel will be substantially the same as the inside diameter of the film whereby as the film passes downwardly thereover, cooling of the film will occur. The purpose of the mandrel is to size the tubular film as well as cool it.

Preferably, the mandrel may be internally cooled with cooling liquid, typically water entering at $2°$ C. to $75°$ C., preferably $2°$ C. to $40°$ C., and leaving at about $4°$ C. to $76°$ C. The major portion of the vertically extending circumferential wall of the mandrel will be cooled by circulating liquid as hereinafter set forth.

The outside surface of the downwardly descending tubular film passing over the mandrel is passed through a body of cooling liquid, preferably water, at $2°$ C. to $90°$ C., maintained in the cooling cell. The hydrostatic pressure of the cooling liquid in the cell assists in maintaining the tubular film in contact with the mandrel.

The mandrel contains a circumferential fluid slot or slots located in the upper portion of the cylinder which provides passageways for the high intensity jet of cooling fluid. The preferred fluid is gas, e.g. air, although it will be seen that one of the embodiments of the present invention is to use liquid (water) or a combination of a gas and liquid, e.g. air and water. While, the term air is used in connection with the prior art, and is used for convenience herein, it is to be understood that the concept of this invention is to use any suitable fluid, not just gas or air.

One of the subcombination inventions of the present application is the improvement of the air slot design within the mandrel so that a given volume of cooling gas can be delivered to the surface of the extrudate at the preferred angle.

Very generally, the air slot is adjusted to provide approximately 100 to 250, preferably 150 to 200, and most preferably 180 to 220 standard cubic feet per minute (scm) of cooling gas to the surface of the resin extrudate when using a 46 inch mandrel.

The factors which govern the volume are a combination of the slot size and the air velocity. Very generally, the width of the slot should be from about 50 to 100 mils, preferably 60 to 70 mils, and most preferably 60 to 68 mils. The length of the land is preferably $\frac{1}{8}$", most preferably at least 3/16", and most preferably at least $\frac{1}{4}$". The slot will have an angle measured from the top horizontal surface of the mandrel of about $25°$ to $45°$, and desirably $25°$ to $35°$ preferably $27°$ to $33°$, and most preferably $29°$ to $31°$.

Another point in the process sequence where one of the features of the invention is profitably employed is in the die orifice itself. It has been discovered and forms a feature of this invention that control of die swell prior to the point where the molten extrudate exists from the die orifice is extremely beneficial.

Many resins, including polypropylene, comprise molecules which are very closely and densely packed in an elastic deformation relationship. When these molecules are compressed under heat and pressure and forced through a narrow channel as in an extrusion die, when they exit from the die they have a tendency to pop out or expand elastically from the very tight configuration that they have been forced into from the confines of the die orifice.

It has been discovered that, if this swell occurs nonuniformly, this undesirably results in the formation of film with defects, such as surface crazing and alternate thin and thick portions.

The problem has been solved according to a feature of this invention by modifying the flow channel of the die orifice. Customarily, a flow channel will gradually taper down to a final gap of about 0.025 inch. That gap will be maintained for a total of about 1 inch. This is customarily referred to as the channel gag or the gap of the flow channel.

According to the invention, the last half inch of the channel gap is increased by flaring it about 2° to 5°, preferably 2° to 4°, and most preferably 3°, measured from the parallel sides which define the flow channel about a half of an inch before the end of the channel where the die lips are located. This will be further illustrated in the detailed discussion of the drawings.

It is also an additional feature of this particular facet of the invention that additional longer internal taper can be provided to supplement the exit flare described above.

The overall effect is to provide a gradual transition so that die swell occurs relatively slowly and within predetermined confined boundaries so that it is controlled and film characterized by lack of uniformity is eliminated.

Another important feature of the present invention resides in the use of constant pressure control of the upper bubble. Previously, before this inventive feature was developed, it was thought that the tubular film in the upper bubble was required to conform to a particular bubble shape. Accordingly, photoelectric tubes were placed at various positions surrounding the bubble so that any variation in the shape of the bubble would be reflected in the instrument circuit and cooling gas would be provided or bled in order to compensate for variations in the tube diameter or shape so that this was kept at a constant value. See U.S. Pat. No. 3,400,184, Column 6, lines 11–38, for a detailed description of this complex control system.

According to the present inventive feature, that type of control based on maintaining a predetermined shape can be completely eliminated. The controlling criteria of this inventive facet is the upper bubble pressure. Thus, it has been discovered that a certain predetermined, defined pressure is critical to good operation and that this particular pressure must be kept constant in order to achieve the desired results.

Very generally, this pressure should be maintained at a constant figure of about 0.1 to 1.0 inch of water in the bubble, preferably 0.15 to 0.32 inch of water, and most preferably about 0.25 inch of water.

This pressure is adjusted during operation until a stable operation is achieved early in the run. Thereafter, the pressure is kept at this level and does not have to be changed continuously in response to other conditions, as had been previously thought. This provides a much easier and more effective mode of control than anything heretofore known.

The tubular water bath process known to the art and exemplified by U.S. Pat. No. 3,400,184 has been used commercially for the production of relatively narrow polyolefin tubing. In this sense narrow is interpreted as being no wider than 40 inches and with a thickness of from 1 mil to 10 mils, preferably 1 to 3 mils.

When the particular difficult-to-process type of polyolefin to be produced as a film is polypropylene, the economics of the marketplace dictate that the mil rolls must be 60 to 80 inches wide. This is because the customer orders will typically call for rolls from 11 to 28 inches wide and the wide 60 to 80 inch material can be slit in multiples, thereby avoiding significant edge-trim losses.

However, when the technique of the prior art is utilized to make this wide polypropylene sheeting, it is only possible to have satisfactory operations, particularly in terms of through-put rates with material of a relatively heavy gauge thickness, i.e., about 2.5 mils to 10.0 mils.

And, if this wide material is subjected to drawdown to the commercial prerequisite of about 1 mil to 2 mils at rates which are commercially feasible, serious difficulties are encountered.

Fundamentally, these difficulties mean that at high rates, film of inferior quality is made because of surface imperfections, and if film is made of commercially acceptable quality, it must be done at such low throughput rates that the operation is grossly noncompetitive.

The improvements of Ser. No. 887,270, Ser. No. 853,381 now U.S. Pat. No. 3,685,576; and Ser. No. 128,338 now U.S. Pat. No. 3,702,224 all help to some extent to overcome the problem, but the problem was still not completely solved even with these innovations since the throughput was still unsatisfactory, i.e. not at commercial rates.

Only when the techniques of the above-described applications are combined with the techniques of the present application were production rates of over 700/lbs./hr. actually accomplished with no surface imperfections.

It is to be noted that the extrudate melt existing initially from the die has a thickness of about 35 mils as contrasted to the final, desired film thickness of 1 to 2 mils. Thus, it is plain that the film not only requires extrusion at high rates through the apparatus, but at the same time very high draw-down rates are expected to take place. This is an extremely difficult feat to achieve.

Although, in general, any conventional film-forming polypropylene grade can be used in the process of the invention, it has been found that polypropylene meeting certain specifications gives optimum results in the process of the invention.

Very generally, polypropylene resins with a shear stress between 18.0 and 22.0, preferably between 19.3 and 21.3 and with a die swell, i.e. swelling ratio between 2.2 and 3.6 but preferably between 2.5 and 3.5 is preferred.

The term "shear stress" means the measurement made at a constant shear rate of 1,280 reciprocal seconds through a capillary die having a diameter of 0.060 inch and a length of about 1 inch at a temperature of 400° F. The "swelling ratio" or the "die swell" is the ratio of an extrudate cross-sectional area to a die cross-sectional area under the same conditions. The method by which polypropylene not initially meeting the specifications can be modified so as to meet them is described in U.S. Pat. Nos. 3,551,953; 3,608,001; 3,563,972; and Ser. No. 102,250, which latter disclosure is herein incorporated in its entirety by reference.

DESCRIPTION OF THE DRAWINGS

In FIG. 1 a typical operation of the invention is shown where film-forming thermoplastic resin is introduced into extruder 10 through hopper 11 from which molten extrudate passes through conduit 12 into die 13 to annular die orifice 14 which is initially tapered and finally flared at the die lip.

(FIG. 2 is a detailed blow-up of this feature. This illustrates the last inch of the extrudate flow channel prior to the extrusion).

In operation, resin is extruded from orifice 14 as a tubular shaped extrudate 15.

Extrudate 15 is passed over mandrel 17 as the external surface of the extrudate 15 is cooled in the water bath in cooling cell 16. The film 15 in the lower bubble resulting from extrudate 15 is collapsed by rolls 18 and thereafter subject to further treatment, as may be required for particular uses.

Cooling fluid, usually and conventionally gas, i.e. air (but not necessarily so limited according to this invention), is introduced into conduit 19 and conveyed under compression and pressure to the interior of mandrel 17 where it is permitted to exit from annular circumferential slot 20.

The fluid exiting from slot 20 serves to precool the interior surface of the molten extrudate 15 prior to its initial contact with mandrel 17. When the fluid from slot 20 is gaseous, e.g. air, it is then permitted to expand upward, where it is maintained at a constant predetermined pressure, as described above, and any excess air is allowed to exit from the system through conduits 21 and 22. These can be further regulated with remote-controlled check valves.

When the fluid is liquid, e.g. water, air is supplied directly to the upper bubble to control the pressure.

In the initial part of the inch it is seen that the flow channel 23 is of constant width. In the last half inch of the flow channel, it can be seen that the constant gap has expanded to flare 24 which is preferably at an angle of about 3° measured from the parallel sides of the constant taper portion of the channel.

FIG. 3 shows, in cross-section, the construction of the mandrel circumferential slot 20 which is in mandrel 17, and which controls gas velocity and direction when gas, usually air, is the precooling medium. The preferred size and angle of this slot are described in detail elaswhere herein.

FIG. 4 illustrates an embodiment where bath liquid (H$_2$O) and gaseous (air) precooling fluids are used together. With this combination, outstanding results can be achieved, since the precooling is more effective and the water inside the film acts as an internal lubricant on the mandrel.

The added cooling efficiency and capacity supplied by the water on the inner surface of the film also prevents the curling noticed with some thick films made from resins such as high density polyethylene, etc. Such curling is apparently caused by the uneven cooling rates between the outer film surface cooled by the water bath and the inner film surface, which is primarily cooled by contact with the metal surface of mandrel 17.

Observation indicates that the cooled metal mandrel does not cool at as fast a rate as direct contact with water in a cooling bath.

The net effect is unequal cooling which causes the undesirable curling or warping. It is avoided with the use of water on the inside of the film.

FIG. 5 illustrates an embodiment where liquid precooling, i.e. water alone in the absence of gas, is used. Both precooling and inner film/mandrel, water cooling are accomplished by this arrangement. The location of water orifice slot 25 as shown in both FIGS. 4 and 5 is chosen so that extrudate/mandrel contact without cooling, lubricating liquid, preferably water, is avoided. Thus, when the extrudate makes initial contact with mandrel 17, there is at least a boundary layer of liquid between it and mandrel 17.

Some of the water will be carried into water bath 16 by the moving extrudate. A portion of the water will build up from the point of contact of extrudate with mandrel. To prevent overflowing, it is desirable to provide in both the FIG. 4 and FIG. 5 embodiments, liquid overflow slots 20b. In the FIG. 5 embodiment slot 20b is located in a separate top mandrel plate assembly 17b.

Moreover, in FIG. 4 air slot 20a is contiguous to liquid overflow slot 20b. These can either drain back into the internal mandrel bath 26 or to any other convenient reservoir, through conduit means (not shown).

Although the tubular water bath technique of the art was especially useful to obtain fast rates because of rapid cooling, the technique of the present invention without "inside-film liquid," i.e. water, permits much better rates and the additional technique which employs "inside-film liquid" enables the obtainment of outstanding through-puts.

The invention will be further illustrated by the following example.

EXAMPLE 1

The working example was carried out on a 36-inch diameter die orifice and a 46-inch diameter mandrel. Other techniques than those specifically described in this example and application as features of the invention were systematically tested, such as various air ring orifice plate settings, die-to-mandrel spacings, and various internal bubble inflation pressures and external air flow rates, but every effort resulted in the production of nonacceptable film at high throughput rates.

Generally, an attempted increase in production rates resulted in having molten plastic hitting the top of the mandrel which caused unacceptable marks on the film.

But with the technique of this example, such deleterious results were avoided. In general, except as stated below, the example utilized the process and apparatus of the drawings and the detailed background conditions of U.S. Pat. No. 3,819,790 of North et al., issued June 25, 1974 (incorporated herein by reference) which illustrated the several inventive features of this application with particular emphasis on the use of air rings.

Polypropylene with a shear stress of about 20 and a die swell of about 3 was extruded at a melt temperature of about 430° F. at a rate of 710 lbs./hr. from the die onto a mandrel, whose upper air slot was located 6.000"±0.250" vertically below the extrudate die orifice in the die. Air was supplied to the external lips at constant flow rate between 500 and 1500 SCFM and air was supplied to the upper slot on top of the mandrel at a flow rate of about 180 SCFM. The air existed from the mandrel air slot at a velocity between 2,800 and 3,200 FPM.

The size of the openings in the top of the die were adjusted to allow this air to exhaust from the upper bubble at a pressure between 0.16 and 0.25 in water. The air slot on the mandrel directed the air upward at an angle to the horizontal of about 30°.

The film of this example was made using air ring lips described in the example given in U.S. Patent Application U.S. Pat. No. 3,819,790 of North et al., issued June 25, 1974 and was adjusted so that the inner lip was 1.531"±0.062" vertically below the die, the middle lip was 2.938"±0.125" vertically below the die and the outer lip was 4.000"±0.250" vertically below the die.

The air ring lips are not illustrated in this application since they are, except for the specific settings used herein, actually the separate invention of said U.S. Pat. No. 3,819,790 of North et al., issued June 25, 1974.

Although the invention has been described with particular emphasis on polypropylene, other film-forming resins, particularly highly crystalline or crystallizable ones, can also benefit from the utilization of the features of this invention. Examples of such resins include polyolefins such as polyethylene, both high density and low density, polymethylbutene-1, polymethylpentene, polystyrene, polyamides (nylons), polyesters (dacron), PVC, and the like.

Furthermore, an orientation step can be appended to the process of the invention so that the film, after passing over the mandrel, can be pulled and oriented in the lower bubble portion of the overall process.

We claim:

1. In a process for the formation of tubular polypropylene film having a width of 60 to 80 inches and a thickness between 1 and 2.5 mils comprising extruding polypropylene resin having a shear stress between 18.0 and 22.0 and a die swell between 2.2 and 3.6, generally downwardly through a die with an annular orifice in the form of a molten substantially tubular film body, maintaining the pressure in said substantially tubular film body at a constant figure of about 0.1 to 1.0 inch of water, preliminarily cooling the internal surface of said tubular film body with a directed stream of gaseous material to partially solidify said film, subsequently downwardly passing said film to engage in sequence a cooling mandrel comprising an air slot at the point of film entry over said mandrel, said mandrel having a texturized surface next to the film and being internally water cooled, a water bath for cooling the exterior of said film comprising a cell designed to control the distribution and flow of cooling water in counter-current fashion against the direction of film flow, said cell having a resilient seal at its lower end to maintain water level within the cell and to minimize water carry over by the film passing through the cell, and an overflow weir at the flow entry point to maintain outflow water level, and utilizing multiple step airing comprising a means for supplying a pressurized air stream from a primary orifice, said stream expanding in control fashion through sucessively larger multiple orifices, thereby guiding and controlling the expansion of the film between the die and mandrel, said successive orifices being independently adjustable in axial position relative to the primary orifice, whereby a plurality of annular pressure zones are arranged externally to said tubular film body in the region between said die and said mandrel, said pressure zones being highest near said die and lowest near said mandrel, to define an expansion gradient for said film between said die and said mandrel and thereafter recovering said tubular film, at through-put rates of about 500 to 540 lbs./hr., the improvement comprising attaining through-put rates of about 700 lbs./hr. by:
(a) effecting controlled, shaped pre-expansion of molten polypropylene from said annular orifice by providing a gradual taper of said orifice to a gap of about 0.025 inch, which is maintained for about 1 inch and subsequently flared at a 2° to 5° angle within said die at the last 0.5 inch of said orifice just prior to extrusion;
(b) effecting said preliminary cooling with a high velocity jet of air at a rate of approximately 100 to 250 scm from an annular slot in said cooling mandrel, the angle of said slot from the horizontal being about 25° to 45° and the width of said slot being from about 50 to 100 mils; and
(c) effecting further cooling along the internal surface of the film with water supplied to the exterior of said cooling mandrel at a point above the level of said water bath for cooling the exterior of the film, said water for cooling the internal surface additionally forming a liquid boundary between the interior of the film and the mandrel.

2. In a process for the formation of tubular polypropylene film having a width of 60 to 80 inches and a thickness between 1 and 2.5 mils comprising extruding polypropylene resin having a shear stress between 18.0 and 22.0 and a die swell between 2.2 and 3.6, generally downwardly through a die with an annular orifice in the form of a molten substantially tubular film body, maintaining the pressure in said substantially tubular film body at a constant figure of about 0.1 to 1.0 inch of water, preliminarily cooling the internal surface of said tubular film body with a directed stream of gaseous material to partially solidify said film, subsequently downwardly passing said film to engage in sequence a cooling mandrel comprising an air slot at the point of film entry over said mandrel, said mandrel having a texturized surface next to the film and being internally water cooled, a water-bath for cooling the exterior of said film comprising a cell designed to control the distribution and flow of cooling water in counter-current fashion against the direction of film flow, said cell having a resilient seal at its lower end to maintain water level within the cell and to minimize water carry over by the film passing through the cell, and an overflow weir at the flow entry point to maintain outflow water level, and utilizing multiple step airing comprising a means for supplying a pressurized air stream from a primary orifice, said stream expanding in control fashion through successively larger multiple orifices, thereby guiding and controlling the expansion of the film between the die and mandrel, said successive orifices being independently adjustable in axial position relative to the primary orifice, whereby a plurality of annular pressure zones are arranged externally to said tubular film body in the region between said die and said mandrel, said pressure zones being highest near said die and lowest near said mandrel, to define an expansion gradient for said film between said die and said mandrel and thereafter recovering said tubular film, at through-put rates of about 500 to 540 lbs./hr. the improvement comprising attaining through-put rates of about 700 lbs./hr. by:
(a) effecting controlled, shaped pre-expansion of molten polypropylene from said annular orifice by providing a gradual taper of said orifice to a gap of about 0.025 inch, which is maintained for about 1 inch and subsequently flared at 2° to 5° angle within said die at the last 0.5 inch of said orifice just prior to extrusion; and
(b) effecting cooling along the internal surface of the film with water supplied to the exterior of said cooling mandrel at a point above the level of said water bath for cooling the exterior of the film, said water for cooling the internal surface additionally forming a liquid boundary between the interior of the film and the mandrel.

3. The process according to claim 1 wherein said die orifice is 36 inches in diameter and said mandrel is 46 inches in diameter.

4. The process according to claim 1 wherein the angle of said slot from the horizontal is from about 25° to about 35°.

* * * * *